United States Patent
Ikeda et al.

(10) Patent No.: US 12,113,383 B2
(45) Date of Patent: Oct. 8, 2024

(54) CHARGING SYSTEM, CHARGING METHOD, AND NON-TRANSITORY COMPUTER-READABLE RECORDING MEDIUM FOR TERMINATING OF CHARGE BASED ON DECREASER BATTERY VOLTAGE

(71) Applicant: Panasonic Intellectual Property Management Co., Ltd., Osaka (JP)

(72) Inventors: Masaki Ikeda, Mie (JP); Tatsuya Miwa, Mie (JP); Yu Ota, Mie (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 786 days.

(21) Appl. No.: 17/218,502

(22) Filed: Mar. 31, 2021

(65) Prior Publication Data

US 2021/0305820 A1    Sep. 30, 2021

(30) Foreign Application Priority Data

Mar. 31, 2020 (JP) .................. 2020-064787

(51) Int. Cl.
*H02J 7/00* (2006.01)
*H01M 10/44* (2006.01)

(52) U.S. Cl.
CPC ........ *H02J 7/0024* (2013.01); *H02J 7/00036* (2020.01); *H02J 7/00302* (2020.01);
(Continued)

(58) Field of Classification Search
CPC .. H02J 7/0024; H02J 7/00036; H02J 7/00302; H02J 7/0047; H02J 7/007182
(Continued)

(56) References Cited

U.S. PATENT DOCUMENTS 3,854,082 A * 12/1974 Nasby ................. H02J 7/00714
320/160
4,388,582 A *  6/1983 Saar ..................... H02J 7/00718
327/15
(Continued)

FOREIGN PATENT DOCUMENTS

CN      107394854 A  * 11/2017
EP         0147241 A2  *  7/1985
(Continued)

OTHER PUBLICATIONS

Notice of Reasons for Refusal issued in corresponding JP Patent Application No. 2020-064787, dated Oct. 31, 2023 w/English MT.
(Continued)

*Primary Examiner* — John T Trischler
(74) *Attorney, Agent, or Firm* — Rimon P.C.

(57) ABSTRACT

A charging system is configured to charge a battery pack including one or more battery cells. The charging system includes an acquirer and a controller. The acquirer is configured to acquire, as an acquisition voltage, a voltage between terminals or a cell voltage of each of the one or more battery cells in the battery pack which is being charged. The controller is configured to, when the voltage between the terminals or the cell voltage reaches a target voltage, cause a first charging mode allowing fast charging to transition to a second charging mode in which a charge current is lower than in the first charging mode. The controller is configured to stop charging operation when the acquisition voltage acquired by the acquirer decreases and an aspect of a decrease in the acquisition voltage satisfies a predetermined condition in the second charging mode.

15 Claims, 4 Drawing Sheets

(52) U.S. Cl.
 CPC .......... *H02J 7/0047* (2013.01); *H02J 7/0071* (2020.01); *H02J 7/00711* (2020.01); *H02J 7/00712* (2020.01); *H02J 7/00714* (2020.01); *H02J 7/007182* (2020.01); *H01M 10/441* (2013.01); *H02J 7/0013* (2013.01)

(58) Field of Classification Search
 USPC ........................................................ 320/117
 See application file for complete search history.

(56) References Cited

U.S. PATENT DOCUMENTS

| | | | | | |
|---|---|---|---|---|---|
| 4,392,101 | A | * | 7/1983 | Saar | H02J 7/007184 320/156 |
| 4,673,826 | A | * | 6/1987 | Masson | H02J 7/0014 307/64 |
| 4,767,977 | A | * | 8/1988 | Fasen | H02J 7/007184 320/155 |
| 4,806,840 | A | * | 2/1989 | Alexander | H01M 10/44 320/164 |
| 5,148,043 | A | * | 9/1992 | Hirata | H02J 9/062 320/136 |
| 5,166,595 | A | * | 11/1992 | Leverich | H02J 7/02 320/160 |
| 5,229,650 | A | * | 7/1993 | Kita | H02J 9/062 307/64 |
| 5,237,259 | A | * | 8/1993 | Sanpei | H02J 7/007182 320/158 |
| 5,352,969 | A | * | 10/1994 | Gilmore | H02J 7/00047 320/160 |
| 5,508,598 | A | * | 4/1996 | Al-Abassy | H02J 7/007182 320/132 |
| 5,617,007 | A | * | 4/1997 | Keidl | H02J 7/00711 320/141 |
| 5,627,452 | A | * | 5/1997 | Okada | H02J 7/007182 320/148 |
| 5,637,979 | A | * | 6/1997 | Tamai | H01M 10/44 320/163 |
| 5,640,079 | A | * | 6/1997 | Nelson | H01M 10/44 320/160 |
| 5,666,006 | A | * | 9/1997 | Townsley | H02J 7/0024 320/124 |
| 5,670,863 | A | * | 9/1997 | Broell | H02J 7/00711 320/160 |
| 5,686,812 | A | * | 11/1997 | Hotta | H02J 7/0031 320/152 |
| 5,686,815 | A | * | 11/1997 | Reipur | H01M 10/48 320/116 |
| 5,710,506 | A | * | 1/1998 | Broell | H02J 7/0071 320/156 |
| 5,929,601 | A | * | 7/1999 | Kaib | H01M 10/48 320/113 |
| 5,945,805 | A | * | 8/1999 | Takei | H02J 7/00047 320/124 |
| 5,945,811 | A | * | 8/1999 | Hasegawa | H02J 7/0013 320/141 |
| 5,994,878 | A | * | 11/1999 | Ostergaard | H02J 7/0071 320/132 |
| 6,075,339 | A | * | 6/2000 | Reipur | H01M 10/4257 320/110 |
| 6,333,619 | B1 | * | 12/2001 | Chavez | H02J 7/0069 320/160 |
| 6,456,042 | B1 | * | 9/2002 | Kwok | H02J 7/00711 320/128 |
| 7,180,272 | B2 | * | 2/2007 | Okahara | H02J 7/0047 320/123 |
| 7,208,915 | B2 | * | 4/2007 | Kubota | H02J 7/007182 320/134 |
| 7,479,763 | B2 | * | 1/2009 | Bertness | H02J 7/342 320/132 |
| 7,489,105 | B2 | * | 2/2009 | Weinstein | H01M 10/425 320/114 |
| 7,528,579 | B2 | * | 5/2009 | Pacholok | H02J 7/02 320/132 |
| 7,777,449 | B2 | * | 8/2010 | Weinstein | H01M 50/247 320/114 |
| 7,808,211 | B2 | * | 10/2010 | Pacholok | H02J 7/02 320/140 |
| 8,076,905 | B2 | * | 12/2011 | Ko | H02J 7/0013 320/160 |
| 8,193,778 | B2 | * | 6/2012 | Morina | H02J 7/04 320/153 |
| 8,436,588 | B2 | * | 5/2013 | Morina | H02J 7/0013 320/153 |
| 8,792,221 | B2 | * | 7/2014 | Ramey | H02J 7/00304 361/91.1 |
| 9,142,993 | B2 | * | 9/2015 | Kawai | H02J 7/00714 |
| 9,209,633 | B2 | * | 12/2015 | Bandai | H02J 7/0042 |
| 9,244,508 | B2 | * | 1/2016 | Horie | G06F 1/263 |
| 9,246,344 | B2 | * | 1/2016 | Suzuki | H01M 10/44 |
| 9,287,721 | B2 | * | 3/2016 | Miwa | H02J 7/00036 |
| 9,559,543 | B2 | * | 1/2017 | Greening | H01M 10/48 |
| 9,588,183 | B2 | * | 3/2017 | Nakayama | G01R 31/385 |
| 9,847,663 | B2 | * | 12/2017 | Nishikawa | H02J 7/007188 |
| 9,917,458 | B2 | * | 3/2018 | Lee | H02J 7/00711 |
| 10,135,277 | B2 | * | 11/2018 | Heo | H01M 10/441 |
| 10,283,993 | B2 | * | 5/2019 | Deng | H02J 7/0071 |
| 10,389,155 | B2 | * | 8/2019 | Deng | H02J 7/0071 |
| 10,404,328 | B2 | * | 9/2019 | Onishi | H04B 5/266 |
| 10,424,959 | B2 | * | 9/2019 | Kim | H02J 7/0071 |
| 10,447,053 | B2 | * | 10/2019 | Tanaka | G06K 19/0708 |
| 10,498,156 | B2 | * | 12/2019 | Zhang | H02J 7/0071 |
| 10,547,189 | B2 | * | 1/2020 | Pourdarvish | H02J 7/0031 |
| 10,868,586 | B2 | * | 12/2020 | Onishi | H04B 5/266 |
| 10,965,145 | B2 | * | 3/2021 | Suzuki | H02J 7/06 |
| 11,218,015 | B2 | * | 1/2022 | Suzuki | H02J 7/00304 |
| 11,283,294 | B2 | * | 3/2022 | Lee | H01M 10/0525 |
| 11,411,409 | B2 | * | 8/2022 | Inoue | H02J 7/0048 |
| 11,411,423 | B2 | * | 8/2022 | Yu | H02J 7/00308 |
| 11,498,444 | B1 | * | 11/2022 | Wiegman | B64C 39/04 |
| 2002/0000788 | A1 | * | 1/2002 | Ostergaard | H02J 7/0031 320/128 |
| 2003/0184264 | A1 | * | 10/2003 | Bertness | H02J 7/342 320/137 |
| 2004/0251876 | A1 | * | 12/2004 | Bertness | H02J 7/342 320/136 |
| 2005/0242784 | A1 | * | 11/2005 | Okahara | H02J 7/14 322/37 |
| 2006/0076921 | A1 | * | 4/2006 | Kubota | H02J 7/00714 320/107 |
| 2006/0208695 | A1 | * | 9/2006 | Weinstein | H02J 7/342 320/112 |
| 2006/0245131 | A1 | * | 11/2006 | Ramey | H02J 7/00304 361/90 |
| 2009/0015209 | A1 | * | 1/2009 | Morina | H02J 7/0071 320/164 |
| 2009/0096428 | A1 | * | 4/2009 | Ko | H02J 7/0013 320/162 |
| 2009/0153103 | A1 | * | 6/2009 | Ikeuchi | H01M 10/486 320/152 |
| 2009/0159330 | A1 | * | 6/2009 | Weinstein | H01M 10/425 29/464 |
| 2009/0251100 | A1 | * | 10/2009 | Incledon | H02J 7/00306 320/137 |
| 2009/0309547 | A1 | * | 12/2009 | Nakatsuji | H02J 7/06 320/164 |
| 2010/0085008 | A1 | * | 4/2010 | Suzuki | H01M 10/482 324/426 |
| 2010/0085010 | A1 | * | 4/2010 | Suzuki | B25F 5/00 320/132 |
| 2011/0012566 | A1 | * | 1/2011 | Sasaki | G03G 15/0266 320/166 |
| 2011/0082621 | A1 | * | 4/2011 | Berkobin | B60L 58/16 701/31.4 |
| 2012/0126750 | A1 | * | 5/2012 | Morina | H02J 7/0013 320/116 |
| 2012/0217931 | A1 | * | 8/2012 | Morina | H02J 7/0071 320/116 |

(56) References Cited

U.S. PATENT DOCUMENTS

| | | | | |
|---|---|---|---|---|
| 2013/0154578 | A1* | 6/2013 | Kawai | H02J 7/00714 |
| | | | | 320/164 |
| 2013/0198536 | A1* | 8/2013 | Horie | G06F 1/263 |
| | | | | 713/300 |
| 2013/0234655 | A1* | 9/2013 | Miwa | H02J 7/04 |
| | | | | 320/107 |
| 2013/0265682 | A1* | 10/2013 | Ramey | H02J 7/0044 |
| | | | | 361/79 |
| 2013/0293188 | A1* | 11/2013 | Bandai | H02J 7/00047 |
| | | | | 320/166 |
| 2013/0335034 | A1* | 12/2013 | Suzuki | H01M 10/0525 |
| | | | | 320/160 |
| 2014/0181541 | A1* | 6/2014 | Matsumoto | H02J 7/00308 |
| | | | | 713/300 |
| 2015/0022160 | A1* | 1/2015 | Greening | H02J 7/007194 |
| | | | | 320/162 |
| 2015/0194831 | A1* | 7/2015 | Lin | B25F 5/00 |
| | | | | 320/107 |
| 2015/0207353 | A1* | 7/2015 | Oku | H02J 7/00308 |
| | | | | 320/107 |
| 2015/0212162 | A1* | 7/2015 | Nakayama | G01R 31/385 |
| | | | | 324/426 |
| 2016/0028255 | A1* | 1/2016 | Nishikawa | H01M 10/44 |
| | | | | 320/162 |
| 2016/0064967 | A1* | 3/2016 | Lee | H02J 7/00711 |
| | | | | 320/112 |
| 2016/0181832 | A1* | 6/2016 | Hatano | H02J 7/00 |
| | | | | 320/162 |
| 2017/0256973 | A1* | 9/2017 | Kim | H02J 7/0071 |
| 2017/0271887 | A1* | 9/2017 | Heo | G01R 31/396 |
| 2018/0048163 | A1* | 2/2018 | Deng | H02J 7/00 |
| 2018/0097262 | A1* | 4/2018 | Kuwabara | B60L 53/14 |
| 2018/0123369 | A1* | 5/2018 | Pourdarvish | H01M 10/44 |
| 2018/0123646 | A1* | 5/2018 | Onishi | H04B 5/266 |
| 2018/0183256 | A1* | 6/2018 | Tanaka | H02J 50/001 |
| 2018/0205234 | A1* | 7/2018 | Zhang | H02J 7/00718 |
| 2019/0089166 | A1* | 3/2019 | Deng | H02J 7/0071 |
| 2019/0170831 | A1* | 6/2019 | Sada | G01R 31/389 |
| 2019/0184842 | A1* | 6/2019 | Waters | B60L 53/12 |
| 2019/0252905 | A1* | 8/2019 | Suzuki | H02J 7/02 |
| 2019/0334355 | A1* | 10/2019 | Kim | H02J 7/0071 |
| 2019/0341969 | A1* | 11/2019 | Onishi | H02J 50/10 |
| 2020/0091757 | A1* | 3/2020 | Suzuki | H02J 7/00304 |
| 2020/0144860 | A1* | 5/2020 | Lee | H01F 38/14 |
| 2020/0153255 | A1* | 5/2020 | Inoue | H02J 7/0016 |
| 2020/0259355 | A1* | 8/2020 | Yu | H02J 7/007182 |
| 2022/0094180 | A1* | 3/2022 | Suzuki | H02J 7/00302 |
| 2023/0010270 | A1* | 1/2023 | Yamaguchi | H01M 50/581 |
| 2023/0179003 | A1* | 6/2023 | Kim | H02J 7/0047 |
| | | | | 320/126 |

FOREIGN PATENT DOCUMENTS

| | | | | | |
|---|---|---|---|---|---|
| EP | | 4099475 | A1 * | 12/2022 | H01M 10/44 |
| JP | | H1032939 | A * | 2/1998 | |
| JP | | 2005-045950 | A | 2/2005 | |
| JP | | 2007-6650 | A | 1/2007 | |
| JP | | 2010-073656 | A | 4/2010 | |
| JP | | 2014-166058 | A | 9/2014 | |
| RU | | 2518520 | C2 | 6/2014 | |

OTHER PUBLICATIONS

Extended European Search Report issued in corresponding EP Patent Application No. 21164451.3, dated Sep. 6, 2021.

Notice of Reasons for Refusal dated Feb. 27, 2024 issued in the corresponding Japanese Patent Application No. 2020-064787, with English translation.

* cited by examiner

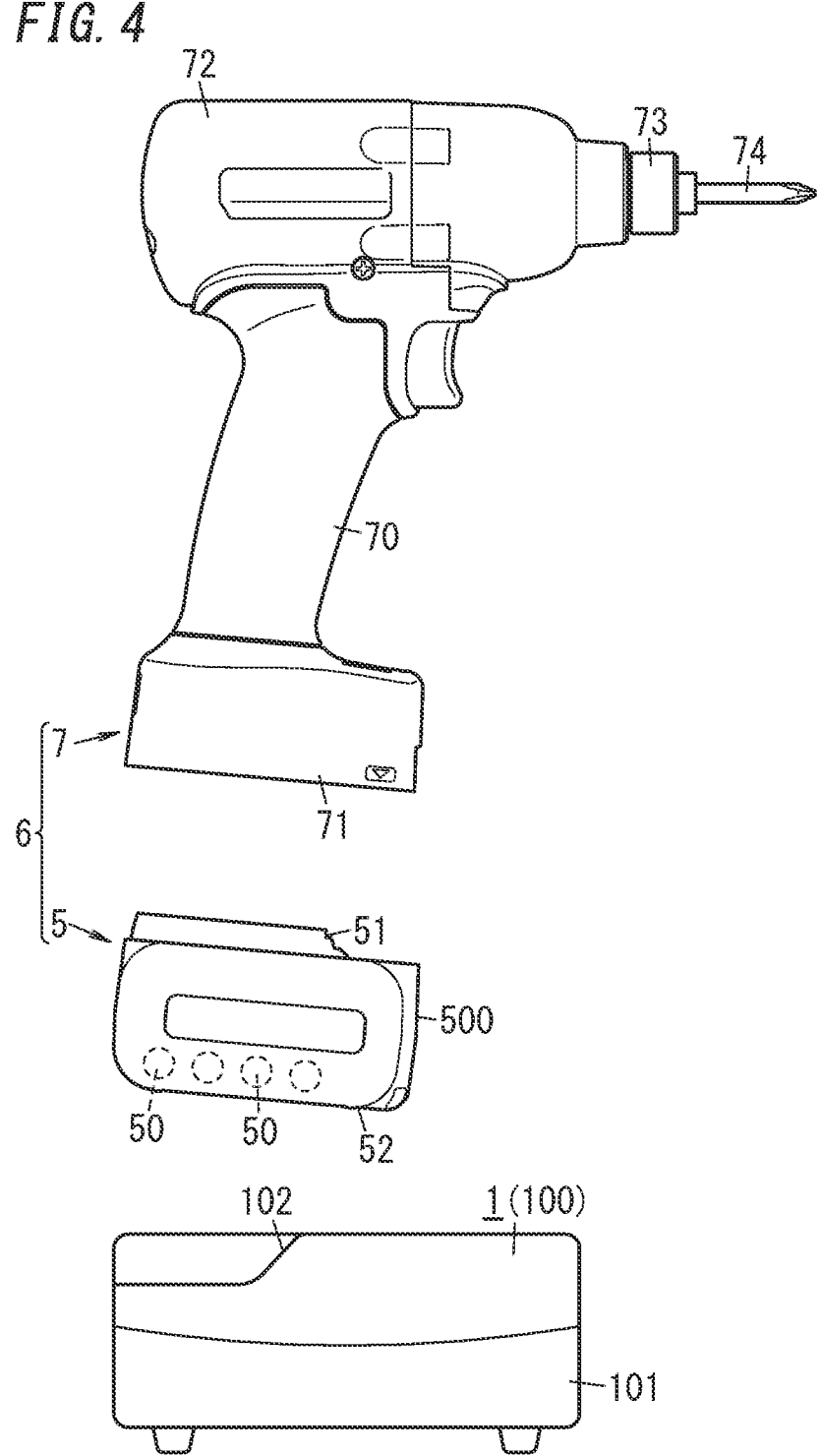

CHARGING SYSTEM, CHARGING METHOD, AND NON-TRANSITORY COMPUTER-READABLE RECORDING MEDIUM FOR TERMINATING OF CHARGE BASED ON DECREASER BATTERY VOLTAGE

CROSS-REFERENCE TO RELATED APPLICATION

The present application is based upon and claims the benefit of priority of Japanese Patent Application No. 2020-064787, filed on Mar. 31, 2020, the entire contents of which are incorporated herein by reference.

TECHNICAL FIELD

The present disclosure generally relates to charging systems, charging methods, and non-transitory computer-readable recording media. The present disclosure specifically relates to a charging system and a charging method for charging a battery pack and to a non-transitory computer-readable recording medium.

BACKGROUND ART

JP 2007-006650 A describes a charger configured to charge a secondary battery (a battery pack) of an electric tool. The charger charges the secondary battery which is an object to be charged with a constant current at the beginning (constant-current charging), and after a charge voltage reaches a voltage defined in advance, the charger performs control such that a charge current is maintained at, or does not exceed, the charge voltage (constant-voltage charging).

SUMMARY

By the way, in a battery pack, for example, deterioration or the like may cause an abnormality such as self short-circuiting (an internal short-circuit) of a battery cell accommodated in the battery pack. Thus, further improvement in reliability relating to charging of the battery pack may be desired.

In view of the foregoing, it is an object of the present disclosure to provide a charging system, a charging method, and a non-transitory computer-readable recording medium which are configured to improve reliability relating to charging of a battery pack.

A charging system of an aspect of the present disclosure is configured to charge a battery pack including one or more battery cells. The charging system includes an acquirer and a controller. The acquirer is configured to acquire, as an acquisition voltage, a voltage between terminals or a cell voltage of each of the one or more battery cells in the battery pack which is being charged. The controller is configured to, when the voltage between the terminals or the cell voltage reaches a target voltage, cause a first charging mode allowing fast charging to transition to a second charging mode in which a charge current is lower than in the first charging mode. The controller is configured to stop charging operation when the acquisition voltage acquired by the acquirer decreases and an aspect of a decrease in the acquisition voltage satisfies a predetermined condition in the second charging mode.

A charging method of an aspect of the present disclosure is a charging method for charging a battery pack including one or more battery cells. The charging method includes an acquisition step, a transfer step, and a stopping step. The acquisition step includes acquiring, as an acquisition voltage, a voltage between terminals or a cell voltage of each of the one or more battery cells in the battery pack which is being charged. The transfer step includes, when the voltage between the terminals or the cell voltage reaches a target voltage, causing a first charging mode allowing fast charging to transition to a second charging mode in which a charge current is lower than in the first charging mode. The stopping step includes stopping charging operation when the acquisition voltage acquired in the acquisition step decreases and an aspect of a decrease in the acquisition voltage satisfies a predetermined condition in the second charging mode.

A recording medium of an aspect of the present disclosure is a non-transitory computer-readable tangible recording medium storing a program designed to cause one or more processors to execute the charging method. A program according to an aspect of the present disclosure is a program designed to cause one or more processors to execute the charging method.

A charging system of an aspect of the present disclosure is configured to charge a battery pack including one or more battery cells. The charging system includes an acquirer and a controller. the acquirer is configured to acquire, as an acquisition voltage, a voltage between terminals or a cell voltage of each of the one or more battery cells in the battery pack which is being charged, the controller is configured to, when the voltage between the terminals or the cell voltage reaches a target voltage, cause a first charging mode allowing fast charging to transition to a second charging mode in which a charge current is lower than in the first charging mode. The controller is configured to stop charging operation when the acquisition voltage acquired by the acquirer decreases and an aspect of a decrease in the acquisition voltage satisfies a predetermined condition in the second charging mode. The controller is configured to restart the charging operation when the acquisition voltage acquired by the acquirer has a voltage value larger than or equal to a prescribed reference value after a lapse of a predetermined time since the charging operation is stopped.

BRIEF DESCRIPTION OF THE DRAWINGS

The figures depict one or more implementation in accordance with the present teaching, by way of example only, not by way of limitations. In the figures, like reference numerals refer to the same or similar elements.

FIG. 4 is an external view illustrating the charging system and an electric tool.

DETAILED DESCRIPTION (1) Schema

The drawings to be referred to in the following description of the embodiment are all schematic representations. That is to say, the ratio of the dimensions (including thicknesses) of respective constituent elements illustrated on the drawings does not always reflect their actual dimensional ratio.

Figure 1:
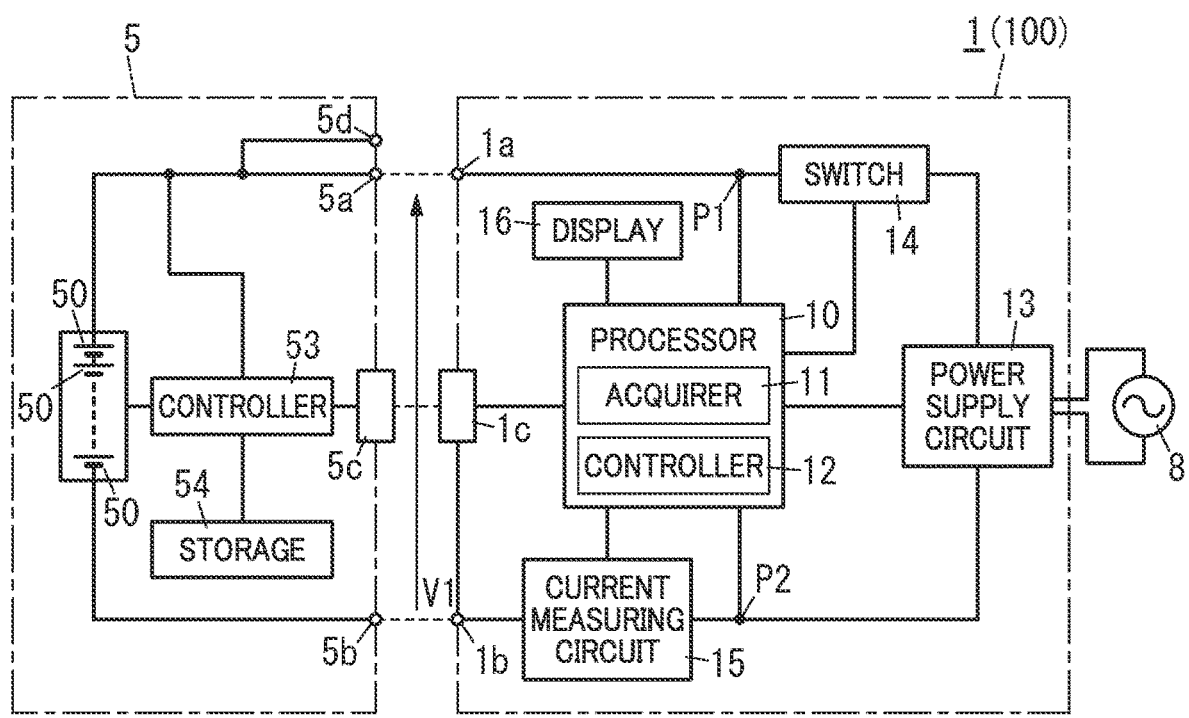
FIG. 1 is a block diagram schematically illustrating a charging system and a battery pack according to an embodiment.

As illustrated in FIGS. 1 and 4, a charging system 100 according to the present embodiment is a system configured to charge a battery pack 5 including one or a plurality of (in the example shown in the figure, a plurality of) battery cells 50. In this embodiment, for example, the charging system 100 has functions all of which are incorporated in a single charger 1 (in a housing 101). However, for example, some of the functions of the charging system 100 may be provided outside the charger 1.

Moreover, for example, the battery pack 5 which is an object to be charged by the charging system 100 is assumed to be a battery pack for an electric tool 6. The battery pack 5 includes a first attachment part 51 which is removably attachable to a tool body 7 (see FIG. 4) of the electric tool 6. However, the functions of the charging system 100 of the present disclosure may be applicable to a system that charges a battery pack for an electrical device (e.g., an information terminal such as a laptop computer, a smartphone, a tablet computer; a camera; and a portable audio apparatus), an electric vehicle, or the like other than the electric tool.

In this embodiment, the charging system 100 includes an acquirer 11 and a controller 12 as illustrated in FIG. 1. The acquirer 11 is configured to acquire, as an acquisition voltage, a voltage V1 between terminals or a cell voltage of each of the one or more battery cells 50 in the battery pack 5 which is being charged. The controller 12 is configured to, when the voltage between the terminals or the cell voltage reaches a target voltage, cause a first charging mode allowing fast charging to transition to a second charging mode in which a charge current is lower than in the first charging mode. In the present embodiment, for example, the first charging mode is assumed to be a charging mode based on a constant current control method, and the second charging mode is assumed to be a charging mode based on a constant voltage control method.

The controller 12 is configured to stop charging operation when the acquisition voltage acquired by the acquirer 11 decreases and an aspect of a decrease in the acquisition voltage satisfies a predetermined condition in the second charging mode. As used herein, the "acquisition voltage" is a voltage acquired in the second charging mode, and the "decrease in the acquisition voltage" is an event that occurs in the second charging mode.

With this configuration, when the acquisition voltage decreases and the aspect of the decrease in the acquisition voltage satisfies the predetermined condition in the second charging mode, the charging operation is stopped. This reduces the possibility that the charging operation is continued in a state where an abnormality such as an internal short-circuit is about to occur in the battery pack 5. Consequently, the charging system 100 has the advantage that the reliability relating to charging of the battery pack 5 can be improved.

(2) Details

The charging system 100 (the charger 1) according to the present embodiment will be described in detail below with reference to FIGS. 1 to 4.

(2.1) Overall Structure

The charger 1 (the charging system 100) is configured to charge the battery pack 5 which is attachable to the tool body 7 of the electric tool 6. That is, the battery pack 5 is a battery pack for the electric tool 6. The charger 1 is compatible with a plurality of (kinds of) battery packs 5, as objects to be charged, having different nominal voltages. Each battery pack 5 has the first attachment part 51 (see FIG. 4) having a shape depending on the nominal voltage thereof and provided on an upper surface of a housing 500. Each battery pack 5 has a second attachment part 52 on a lower surface of the housing 500. FIG. 4 is a side view illustrating the charger 1, the tool body 7, and the battery pack 5.

The tool body 7 includes a grip 70, an attachment 71, and a body section 72. The grip 70 and the body section 72 form a housing of the tool body 7, and in the interior thereof, a motor, a tool controller for controlling the motor, a deceleration mechanism for decelerating the motor, a drive transmission mechanism of an output shaft that rotates at a decelerated rotation speed. A chuck 73 is attached to the body section 72. A bit (tip end tool) such as a driver bit 74 or a drill bit is attached to the chuck 73. The motor operates based on electric power output from the battery pack 5 attached to the tool body 7 and rotates the bit. The motor is, for example, a brushless motor.

The first attachment part 51 is attached to the attachment 71 at a lower end of the grip 70 of the tool body 7, and thereby, the battery pack 5 is mechanically and electrically connected to the tool body 7. This allows the battery pack 5 to supply electric power to the tool body 7 and to transmit information on the battery pack 5 to the tool body 7. Moreover, the second attachment part 52 is slid to be attached to a pack attachment part 102 at an upper surface of the housing 101 of the charger 1, and thereby, the battery pack 5 is mechanically and electrically connected to the charger 1.

The charger 1 includes a plug and a cord. The plug is connectable to an outlet which receives electric power supplied from an alternating-current power supply 8 (see FIG. 1, an effective value of, for example, 100 V) such as a commercial power supply. The charger 1 charges the plurality of battery cells 50 of the battery pack 5 with electric power supplied from the alternating-current power supply 8 via the plug and the cord.

(2.2) Battery Pack

The battery pack 5 includes the plurality of battery cells 50 accommodated in the housing 500. The plurality of battery cells 50 are secondary batteries repeatedly usable by being charged. Each battery cell 50 is, for example, a lithium-ion battery. The plurality of battery cells 50 are connected in series.

As illustrated in FIG. 1, the battery pack 5 further includes a controller 53, a storage 54, and the like.

The storage 54 is, for example, electrically erasable programmable read-only memory (EEPROM). The storage 54 stores pieces of information regarding item numbers of various types of tool bodies 7 different from each other in item number, ranges of voltages suppliable to the various types of tool bodies 7 different from each other in item number, and pieces of information associating the pieces of information regarding the item numbers with the ranges of the voltages. That is, the storage 54 stores the pieces of information regarding the item numbers of the various types of tool bodies 7 and the ranges of the voltages suppliable to the tool bodies 7 having the item numbers in association with each other. Moreover, the storage 54 of the present embodiment includes a storage area for storing an abnormality detection flag which will be described later.

The controller 53 is configured to perform control relating to charging and discharging. The controller 53 may be implemented by a computer system including one or more processors (microprocessors) and one or more memory elements. That is, the one or more processors execute one or more programs (applications) stored in the one or more memory elements to provide functions as the controller 53. In this embodiment, the program is stored in advance in the memory of the controller 53. However, this is only an example and should not be construed as limiting. The program may also be downloaded via a telecommunications network such as the Internet or may be distributed after having been stored in a non-transitory storage medium such as a memory card.

The controller 53 acquires, from the tool body 7, information on the item number of the tool body 7 to which the battery pack 5 is attached, and the controller 53 checks the item number with a plurality of item numbers stored in the storage 54. If the same item number as the item number acquired has been stored in the storage 54, the controller 53 determines, based on the pieces of information stored in the storage 54, a range of a voltage suppliable to the tool body 7 having the item number and controls a total output (discharge) of the plurality of battery cells 50 such that a total voltage of the plurality of battery cells 50 is within this range. This enables the battery pack 5 to be used in each of a plurality of tool bodies 7 which are different from each other in item number and in range of an applicable voltage.

As illustrated in FIG. 1, the battery pack 5 further includes a charging terminal 5a (a plus terminal), a charging and discharging terminal 5b (a minus terminal), a communication signal terminal 5c, and a discharging terminal 5d (a plus terminal).

The first attachment part 51 of the battery pack 5 is attached to the attachment 71 of the tool body 7, and thereby, the discharging terminal 5d and the charging and discharging terminal 5b are electrically connected to respective input terminals of the tool body 7 which are paired. Thus, the tool body 7 can receive a discharge voltage from the battery pack 5 via the discharging terminal 5d and the charging and discharging terminal 5b. Moreover, a communication connection part of the tool body 7 and a communication connection part of the battery pack 5 are electrically connected to each other, and thereby, the tool body 7 and the battery pack 5 can transmit and receive various kinds of information to and from each other.

On the other hand, the second attachment part 52 of the battery pack 5 is attached to the pack attachment part 102 of the charger 1, and thereby, the charging terminal 5a and the charging and discharging terminal 5b are electrically connected to output terminals (a positive output terminal 1a and a negative output terminal 1b which are paired) of the charger 1. Moreover, the signal terminal 5c is electrically connected to a signal terminal 1c of the charger 1. Thus, the battery pack 5 can receive a charge voltage via the charging terminal 5a and the charging and discharging terminal 5b from the charger 1 and can transmit and receive various kinds of information via the signal terminal 5c to and from the charger 1.

The battery pack 5 further includes a conversion circuit including a DC-DC converter, a temperature sensor configured to detect the temperature of the battery pack 5 while the battery pack 5 is charged, and the like.

The conversion circuit performs DC-DC conversion of a direct-current voltage as an output voltage (a total output voltage) of the plurality of battery cells 50 into a voltage within the range suppliable to the tool body 7, and the conversion circuit outputs the voltage to the tool body 7 via the discharging terminal 5d and the charging and discharging terminal 5b. An inverter of the tool body 7 converts the direct-current voltage output from the conversion circuit of the battery pack 5 into alternating-current power and outputs the alternating-current power to the motor. The temperature sensor includes a thermistor and the like and transmits a detection temperature to a connection destination (the charger 1) via the signal terminal 5c with a voltage difference from a ground terminal.

In FIG. 1, the signal terminal 1c and the signal terminal 5c are schematically shown, but each of the signal terminal 1c and the signal terminal 5c includes a plurality of signal terminals.

The plurality of signal terminals of the signal terminal 5c include the ground terminal, an output terminal for the detection temperature, an output terminal for outputting the number of battery cells 50 connected in series with the voltage difference from the ground terminal, and a control terminal for receiving a control signal from the charger 1 to start the controller 53. The plurality of signal terminals of the signal terminal 5c further include an over-discharging terminal for transmitting an overdischarge detection signal to the connection destination (the charger 1) when overdischarge is detected in the battery pack 5. Moreover, the plurality of signal terminals of the signal terminal 5c further include a full-charge terminal, a transmission and reception terminal, and the like. When any one of the battery cells 50 is fully charged (when a state is achieved where the charging capacity of the battery pack 5 as a whole is higher than or equal to about 80%), the full-charge terminal transmits that effect. The transmission and reception terminal relates to the number of the times of the start of charging.

The plurality of signal terminals of the signal terminal 1c include terminals correspondingly connected to the plurality of signal terminals of the signal terminal 5c on a one-to-one basis.

Now, the function of the controller 53 of the battery pack 5 at the time of charging will be briefly described.

The controller 53 monitors the charge voltage of each battery cell 50 at the time of charging. When the controller 53 detects abnormal overcharge in any of the battery cells 50, the controller 53 controls an overcharge protection circuit such that a fusing resistor is fused by heat generated by electric conduction, thereby cutting off a charge current from the charger 1.

Moreover, the controller 53 monitors the charge voltage of each battery cell 50 at the time of charging, and as described above, when any of the battery cells 50 is fully charged, the controller 53 transmits a switching signal including that effect to the charger 1 via the full-charge terminal. At a timing at which the charger 1 receives the switching signal, the charger 1 changes its charging mode from the first charging mode (the constant current control) to the second charging mode (the constant voltage control).

(2.3) Charger

As illustrated in FIG. 1, the charger 1 (the charging system 100) includes a processor 10, a power supply circuit 13, a switch 14, and a current measuring circuit 15. The charger 1 further includes a display 16. The display 16 includes a light source such as a light emitting diode (LED) and a lighting circuit for turning on the light source. The display 16 is configured to notify the outside of the charge state by the lighting mode of the light source. The processor 10, the power supply circuit 13, the switch 14, the current measuring circuit 15, and the display 16 are accommodated in the housing 101. The charger 1 further includes a lamp cover which is light transmitting. The lamp cover is held by the housing 101, for example, in a state where the lamp cover is exposed from the upper surface of the housing 101. The lighting mode of the light source of the display 16 is visually perceivable through the lamp cover.

The processor 10 is configured to perform control of charging of the battery pack 5. The processor 10 executes a control process relating to the power supply circuit 13, the switch 14, the current measuring circuit 15, and the display 16. The processor 10 may be implemented by a computer system including one or more processors (microprocessors) and one or more memory elements. That is, the one or more processors execute one or more programs (applications) stored in the one or more memory elements to provide functions as the processor 10. In this embodiment, the program is stored in advance in the memory of the processor 10. However, this is only an example and should not be construed as limiting. The program may also be downloaded via a telecommunications network such as the Internet or may be distributed after having been stored in a non-transitory storage medium such as a memory card.

The processor 10 includes the acquirer 11 and the controller 12. In other words, the processor 10 has a function as the acquirer 11 and a function as the controller 12.

The acquirer 11 is configured to acquire, as an acquisition voltage, a voltage V1 between terminals (or a cell voltage of each of the battery cells 50) while the battery pack 5 is charged. In this embodiment, the acquirer 11 measures a voltage between a first node P1 (node point) and a second node P2 (node point) as the voltage V1 between terminals. The first node P1 is provided, for example, on an electric path connected between the output terminal 1a and the switch 14 and is electrically connected to the processor 10. The second node P2 is provided, for example, on an electric path connected between the power supply circuit 13 and the current measuring circuit 15 and is electrically connected to the processor 10.

The controller 12 is configured to, when the voltage V1 between the terminals or the cell voltage reaches a target voltage, cause a first charging mode allowing fast charging to transition to a second charging mode in which a charge current is lower than in the first charging mode. In this embodiment, for example, the controller 12 causes the first charging mode to transition to the second charging mode when receiving a switching signal which is transmitted from the battery pack 5 via the full-charge terminal at the time of a full charge of any one of the battery cells 50. Moreover, as described above, for example, the first charging mode is assumed to be a charging mode based on the constant current control method, and the second charging mode is assumed to be a charging mode based on the constant voltage control method. In the following description, charging based on the constant current control method may be referred to simply as "CC (Constant Current) charging", and charging based on the constant voltage control method may be referred to simply as "CV (Constant Voltage) charging" (see FIG. 2). In the graph shown in FIG. 2, the CC charging is performed until a time t0 and is switched to the CV charging at the time to. When the charging capacity of the battery pack 5 is less than about 80%, the charger 1 performs fast charging by the CC charging which keeps the charge current constant, and when the charging capacity becomes greater than or equal to about 80%, the charger 1 switches the CC charging to the CV charging and performs charging operation such that the battery pack 5 is approximately fully charged.

The switch 14 includes, for example, a field effect transistor (FET) and the like and is provided on an electric path between the first node P1 and the power supply circuit 13. The switch 14 is electrically connected to the processor 10. The controller 12 detects the voltage difference between the output terminals 1a and 1b (the voltage V1 between terminals) to sense that the battery pack 5 is attached to the charger 1. Then, when the controller 12 determines that the voltage V1 between the terminals, the detection temperature of the battery pack 5, and the like have no abnormality, the controller 12 turns ON the switch 14, controls the power supply circuit 13, and starts the CC charging.

The power supply circuit 13 includes, for example, an AC-DC converter which converts alternating-current power received from the alternating-current power supply 8 into direct-current power. The power supply circuit 13 is provided, for example, on an electric path between the switch 14 and the second node P2. The power supply circuit 13 is electrically connected to the processor 10. The power supply circuit 13 generates a predetermined charge voltage and a predetermined charge current under control by the controller 12.

The current measuring circuit 15 includes a current detection resistor and the like. The current measuring circuit 15 is provided, for example, on an electric path between the output terminal 1b and the second node P2 and measures a charge current that flows through the electric path. The current measuring circuit 15 is electrically connected to the processor 10 and outputs a measurement result of the charge current thus measured to the processor 10. When the current value of the charge current measured by the current measuring circuit 15 decreases to a prescribed value (e.g., 100 mA) or lower, the controller 12 controls the power supply circuit 13 such that the charging operation is stopped, and the controller 12 turns OFF the switch 14.

Note that the display 16 is continuously lit while the charger 1 is performing the CC charging, and when the CC charging is switched to the CV charging, the display 16 is switched to an intermittent lighting mode. The display 16 is switched to the intermittent lighting mode, and thereby, a user is notified that the battery pack 5 has been sufficiently charged for practical use (a state where the charging capacity is greater than or equal to about 80%). When the battery pack 5 is detached from the charger 1, the display 16 is turned OFF.

(2.4) CV Charging

Figure 2:
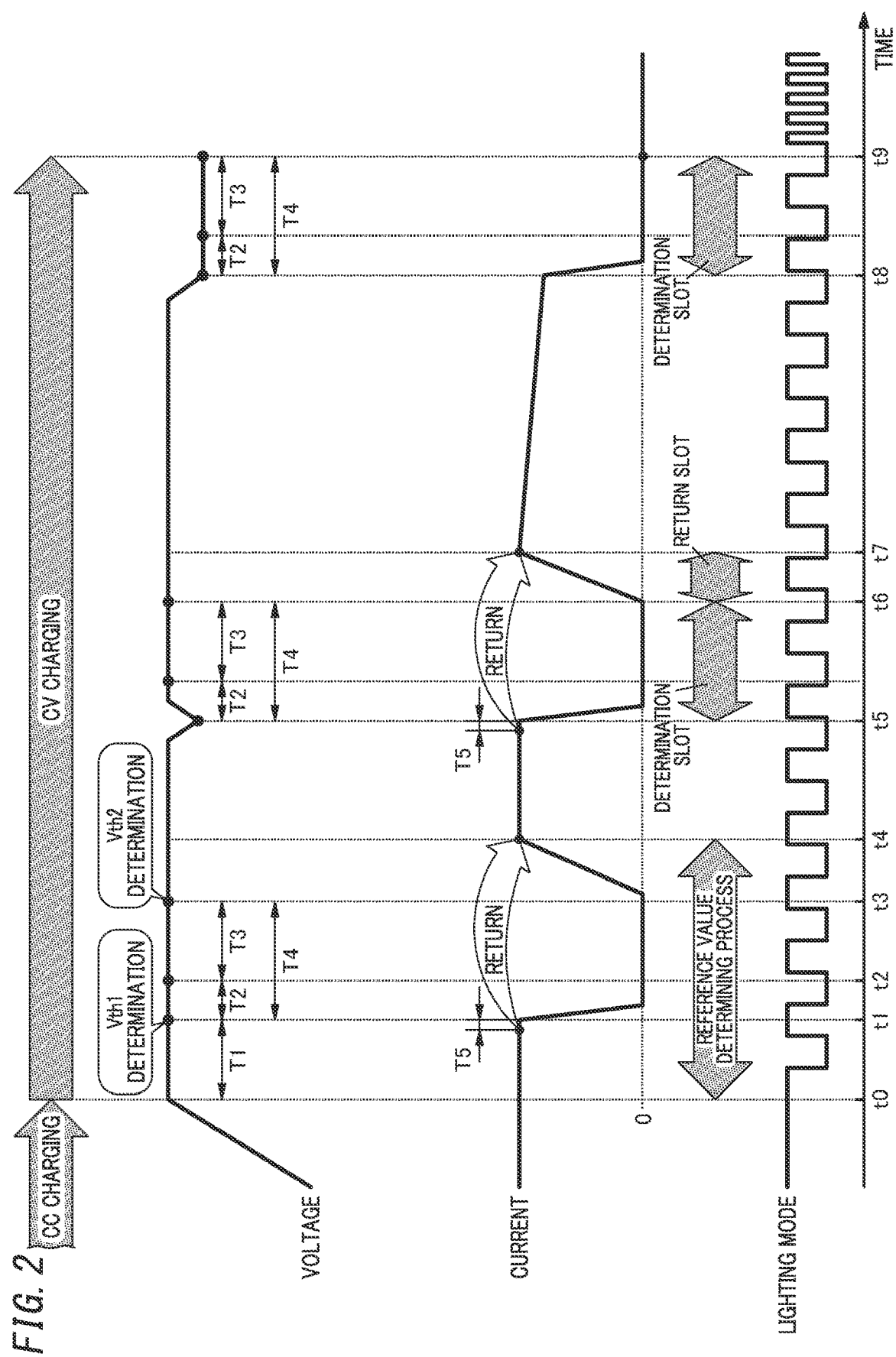
FIG. 2 is a graph illustrating operation of the charging system.

Next, a process performed in the charger 1, which is performing the CV charging, to detect (signs of) an abnormality in the battery pack 5 will be described in detail with reference to FIG. 2. Note that FIG. 2 is a graph of an example in which the battery pack 5 having a nominal voltage of about 18.8 V is charged. It is assumed that the charger 1 performs the CV charging such that the voltage V1 between terminals, that is, between the first node P1 and the second node P2 is kept constant at a voltage of about 21 V.

The controller 12 of the processor 10 in the charger 1 of the present embodiment is configured to stop the charging operation when the acquisition voltage acquired by the acquirer 11 decreases and an aspect of a decrease in the acquisition voltage satisfies a predetermined condition in the CV charging (the second charging mode). In this embodiment, the predetermined condition is that the voltage value of the acquisition voltage is smaller than or equal to a predetermined reference value (hereinafter also referred to as a "first reference value Vth1"). Moreover, as used herein, the "first reference value Vth1 (the predetermined reference value)" is computed based on an acquisition voltage which the acquirer 11 acquires within a "predetermined time period T1". Then, the controller 12 performs a determining process (hereinafter also referred to as a "first determining process") based on the first reference value Vth1, and when the predetermined condition is satisfied, the controller 12 stops the charging operation.

In the present embodiment, the predetermined time period T1 is a time period immediately after a switching timing at which the CC charging is switched to the CV charging, and information of the predetermined time period T1 is set (stored) in the memory of the processor 10 in advance. That is, the starting point of the predetermined time period T1 is the switching timing (the time t0). In other words, in the example shown in FIG. 2, the charger 1 receives the switching signal from the battery pack 5 at the time to.

The predetermined time period T1 may be, however, a time period immediately before the switching timing. For example, the starting point of the predetermined time period T1 may be before the time t0, and the end time point of the predetermined time period T1 may be before or after the time t0. In this case, the charger 1 receives an auxiliary signal from the battery pack 5 before the switching signal, that is, at a timing before any of the battery cells 50 is fully charged, and the predetermined time period T1 is preferably started at a timing at which the charger 1 receives the auxiliary signal.

The predetermined time period T1 is a time period from the time t0 to a time t1. The predetermined time period T1 is, for example, a time period within a range from several seconds to several tens of seconds and is assumed to be, for example, about 10 seconds. In the predetermined time period T1, the acquirer 11 acquires the acquisition voltage to determine the first reference value Vth1.

Specifically, the acquirer 11 acquires sampling data of the voltage V1 between terminals, that is, between the first node P1 and the second node P2 over a time period of several hundreds of milliseconds several tens of times to obtain an average value (a first average value) of the data. In addition, the acquirer 11 repeats the computing of the first average value about several tens of times over the predetermined time period T1 to obtain an average value (a second average value) from several tens of first average values, subtracts a predetermined value (e.g., several hundreds of millivolts (mV)) from the second average value to obtain a value, and determines that the value thus obtained is the first reference value Vth1. The predetermined value is a value, where it is determined that a voltage decreases by the value as a sign when an abnormality such as self short-circuiting (an internal short-circuit) is about to occur in the battery pack 5, and the value is set based on a result of a verification experiment. The sampling period depends on, for example, the main clock of the processor 10 and is not particularly limited. The processor 10 determines the first reference value Vth1 at the time t1 and stores the first reference value Vth1 thus determined in the memory of the processor 10.

Here, the controller 12 is configured to execute a second determining process in addition to the first determining process based on the first reference value Vth1. When the determination result by the first determining process satisfies the predetermined condition, the controller 12 stops the charging operation and then executes the second determining process. If determination result of the first determining process does not satisfy the predetermined condition, the controller 12 does not stop the charging operation and does not execute the second determining process. In other words, the first determining process is a trigger process for determining whether or not the second determining process is to be executed.

Specifically, after a predetermined time T2 has elapsed since the charging operation was stopped, the controller 12 executes a determining process (the second determining process) of determining the presence or absence of (signs of) an abnormality in the battery pack 5, and if the abnormality is absent in the determining process (the second determining process), the controller 12 restarts the charging operation. The controller 12 controls the power supply circuit 13 such that the charge current is adjusted to 0 (zero) ampere, thereby stopping the charging operation (at this time point, the switch 14 remains ON). That is, the controller 12 executes abnormality determination, as the second determining process, at an Open Circuit Voltage (OCV), that is, without applying a load (a voltage) to the battery pack 5. In the present embodiment, the predetermined time T2 is a stand-by time of waiting, after the controller 12 starts feedback control for adjusting the charge current to 0 ampere, until the charge current actually stably becomes 0 ampere, and the stand-by time is set (stored) in the memory of the processor 10 in advance. The predetermined time T2 is shorter than the predetermined time period T1. The predetermined time T2 is set, for example, within a range from about 0.5 second to about 20 seconds.

The determining process (the second determining process) mentioned herein determines that (signs of) an abnormality is absent when the voltage value of the acquisition voltage acquired by the acquirer 11 after the lapse of the predetermined time T2 is larger than or equal to a prescribed reference value (hereinafter also referred to as a "second reference value Vth2"). Moreover, the "second reference value Vth2 (the prescribed reference value)" mentioned herein is computed based on an acquisition voltage acquired by the acquirer 11 within a "prescribed time period T3".

The prescribed time period T3 is a time period from a time t2 to a time t3. The prescribed time period T3 is, for example, a time period within a range from several seconds to several tens of seconds and is assumed to be, for example, about 10 seconds. In this embodiment, for example, the prescribed time period T3 is set to the same length as the predetermined time period T1. In the prescribed time period T3, the acquirer 11 acquires the acquisition voltage to determine the second reference value Vth2.

Note that the controller 12 is configured to once stop the charging operation such that a situation similar to a situation (OCV) where the second determining process is actually executed is created to compute the second reference value Vth2 to be used in the second determining process. At the time t1 at which the first reference value Vth1 is determined, the controller 12 controls the power supply circuit 13 such that the charge current is 0 ampere, thereby stopping the charging operation. The controller 12 waits until the charge current stably becomes 0 ampere in a similar manner to the second determining process actually executed. That is, the controller 12 waits from the time t1 until the predetermined time T2 set in advance elapses, and the controller 12 starts a process for determining the second reference value Vth2 at the time t2 which is the end time point of the predetermined time T2.

In the present embodiment, a computation method of the second reference value Vth2 is the same as a computation method of the first reference value Vth1 except that the charging operation is in an OFF state. That is, the acquirer 11 acquires sampling data of the voltage V1 between terminals, that is, between the first node P1 and the second node P2 over a time period of several hundreds of milliseconds several tens of times to obtain an average value (a first average value) of the voltages V1. In addition, the acquirer 11 repeats the computing of the first average value about several tens of times over the prescribed time period T3 to obtain an average value (a second average value) from tens of first average values, subtracts the predetermined value (e.g., several hundreds of millivolts (mV)) from the second average value to obtain a value, and determines that the value thus obtained is the second reference value Vth2. The sampling period depends on, for example, the main clock of the processor 10 and is not particularly limited. The processor 10 determines the second reference value Vth2 at the time t3 and stores the second reference value Vth2 thus determined in the memory of the processor 10.

At the time t3 at which the second reference value Vth2 is determined, the controller 12 starts a return process for restarting the charging operation. That is, the controller 12 controls the power supply circuit 13 such that the current value of the charge current is returned (increased) to the current value (a target value) of the charge current immediately before the feedback control for adjusting the charge current to 0 ampere is started.

The target value to which the value of the charge current is to be returned may be the current value at the time t1 at which the feedback control is started, but in the present embodiment, for example, the controller 12 returns the value to a target corresponding to the value of the charge current at a time point leading by a definite time T5 from the time t1. The definite time T5 is a time corresponding to several seconds to several tens of seconds and is assumed to be set to, for example, about 1 second in advance. The reason why the definite time T5 is set will be described later. In the example shown in FIG. 2, the value of the charge current is returned to the target value at a time t4.

In sum, a time slot from the time to at which the CV charging is started to the time t4 is a process slot in which a process for determining two reference values (Vth1, Vth2) used in the first determining process and the second determining process is performed. In other words, the charger 1 determines the two reference values based on an actually measured value in preparation for detection of the signs of the abnormality which may occur in the battery pack 5 during the CV charging.

Note that a time period which is the sum of the predetermined time T2 and the prescribed time period T3 may also be referred to as a stop time period T4.

A determining process performed by the processor 10 based on the two reference values (Vth1, Vth2) thus determined will be described below.

The processor 10 monitors the voltage V1 between terminals, that is, between the first node P1 and the second node P2 during the CV charging. In FIG. 2, "voltage" schematically represents a change in the voltage V1 between terminals, and "current" schematically represents a change in the charge current. Then, the controller 12 of the processor 10 determines whether or not after the time t4, the acquisition voltage acquired by the acquirer 11 decreases and (the predetermined condition) that the voltage value of the acquisition voltage is smaller than or equal to the first reference value Vth1 is satisfied (the first determining process). In this embodiment, the acquirer 11 repeats the computing of the first average value about several tens of times over the predetermined time period T1 and computes an average value (a second average value) from several tens of first average values in a similar manner to the computation of the second average value at the time of determining the first reference value Vth1. The average value thus computed is defined as a "voltage value Va1 of the acquisition voltage".

After the time t4, the controller 12 computes the voltage value Va1 at a cycle of the predetermined time period T1 to perform determination by comparison to the first reference value Vth1. That is, the controller 12 continues the CV charging until the predetermined condition "Va1≤Vth1" is satisfied while repeatedly performing the determination by the comparison between the voltage value Va1 and the first reference value Vth1 at the cycle of the predetermined time period T1.

When the predetermined condition "Va1≤Vth1" is satisfied during the CV charging, the controller 12 then stops the charging operation and starts the second determining process.

In the example shown in FIG. 2, the charge voltage decreases by about several hundreds of millivolts at the time t5. Consequently, the controller 12 determines that the charge voltage decreases at the time t5 and that the predetermined condition "Va1≤Vth1" is satisfied. Therefore, the controller 12 controls the power supply circuit 13 at the time t5 such that the feedback control for adjusting the charge current to 0 ampere is started (stopping of the charging operation). That is, the controller 12 stops the charging operation to create a state where influence such as a ripple voltage is removed, and the controller 12 then performs the second determining process.

The processor 10 waits until the predetermined time T2 has elapsed since the time t5 at which the feedback control for adjusting the charge current to 0 ampere is started in a similar manner to the determination process of the second reference value Vth2. After the predetermined time T2 has elapsed, the acquirer 11 repeats the computing of the first average value about several tens of times over the prescribed time period T3 and computes an average value (a second average value) from several tens of first average values in a similar manner to the computation of the second average value of the determining process of the second reference value Vth2. The average value thus computed is defined as a "voltage value Va2 of the acquisition voltage". That is, the controller 12 computes the voltage value Va2 in the prescribed time period T3 after the predetermined time T2 has elapsed, and the controller 12 performs determination by comparison to the second reference value Vth2.

Then, if "Va2≤Vth2" is satisfied in the second determining process, the controller 12 "completely stops" the charging operation (turns OFF the switch 14). In contrast, if "Va2≤Vth2" is not satisfied in the second determining process, the controller 12 restarts the charging operation.

In the example shown in FIG. 2, the controller 12 determines that "Va2≤Vth2" is not satisfied at a time t6 at which the stop time period T4 (a time period which is the sum of the predetermined time T2 and the prescribed time period T3) has elapsed since the time t5. Therefore, the controller 12 returns (increases), at the time t6, the current value of the charge current to the current value (a target value) of the charge current immediately before the feedback control for adjusting the charge current to 0 ampere is started. Also in this case, for example, the controller 12 returns the value to a target corresponding to the current value of the charge current at a time point leading by the definite time T5 from the time t5. In the example shown in FIG. 2, the value of the charge current is returned to the target value at a time t7.

In the example shown in FIG. 2, the controller 12 continues the CV charging after the time t7 at which the charging operation is restarted until a time t8. Note that during the CV charging, control of keeping the charge voltage constant is performed, and therefore, the charge current gradually decreases (see the time t7 to the time t8).

In this embodiment, in the example shown in FIG. 2, the charge voltage decreases again by about several hundreds of millivolts at the time t8. Consequently, the controller 12 determines at the time t8 that the charge voltage decreases and that the predetermined condition "Va1≤Vth1" is satisfied. Therefore, the controller 12 controls the power supply circuit 13 at the time t8 such that the feedback control for adjusting the charge current to 0 ampere is started (stopping of the charging operation).

In the example shown in FIG. 2, the controller 12 determines, at a time t9 at which the stopping time period T4 (a time period which is the sum of the predetermined time T2 and the prescribed time period T3) has elapsed since the time t8, that "Va2≤Vth2" is satisfied and that the signs of an abnormality in the battery pack 5 is detected. Therefore, the controller 12 "completely stops" the charging operation without restarting the charging operation at the time t9. The controller 12 switches the lighting mode of the display 16 from an intermittent lighting mode representing completion of satisfactory charging for practical use to a flashing lighting mode with a shortened ON interval and a shortened OFF interval of the intermittent lighting mode, thereby notifying a user that the charging is forcibly stopped due to the signs of the abnormality.

Moreover, the controller 12 communicates with the battery pack 5 and causes an "abnormality detection flag" to be written in a dedicated storage area in the storage 54 so that the charger 1 will never charge again the battery pack 5 which is currently connected to the charger 1 and about which the signs of the abnormality is made. In other words, the processor 10 is configured to, when the battery pack 5 is attached to the charger 1 of the present embodiment, check the presence or absence of the abnormality detection flag before starting the charging operation. If the abnormality detection flag is absent in the storage area, the processor 10 starts the charging operation, but if the abnormality detection flag is present in the storage area, the processor 10 does not start the charging operation but changes the lighting mode of the display 16 to the flashing lighting mode to notify a user that the charging is impossible. In the battery pack 5, when the abnormality detection flag is once written in the storage area, the abnormality detection flag will never be erased again.

(2.5) Operation Description

Figure 3:
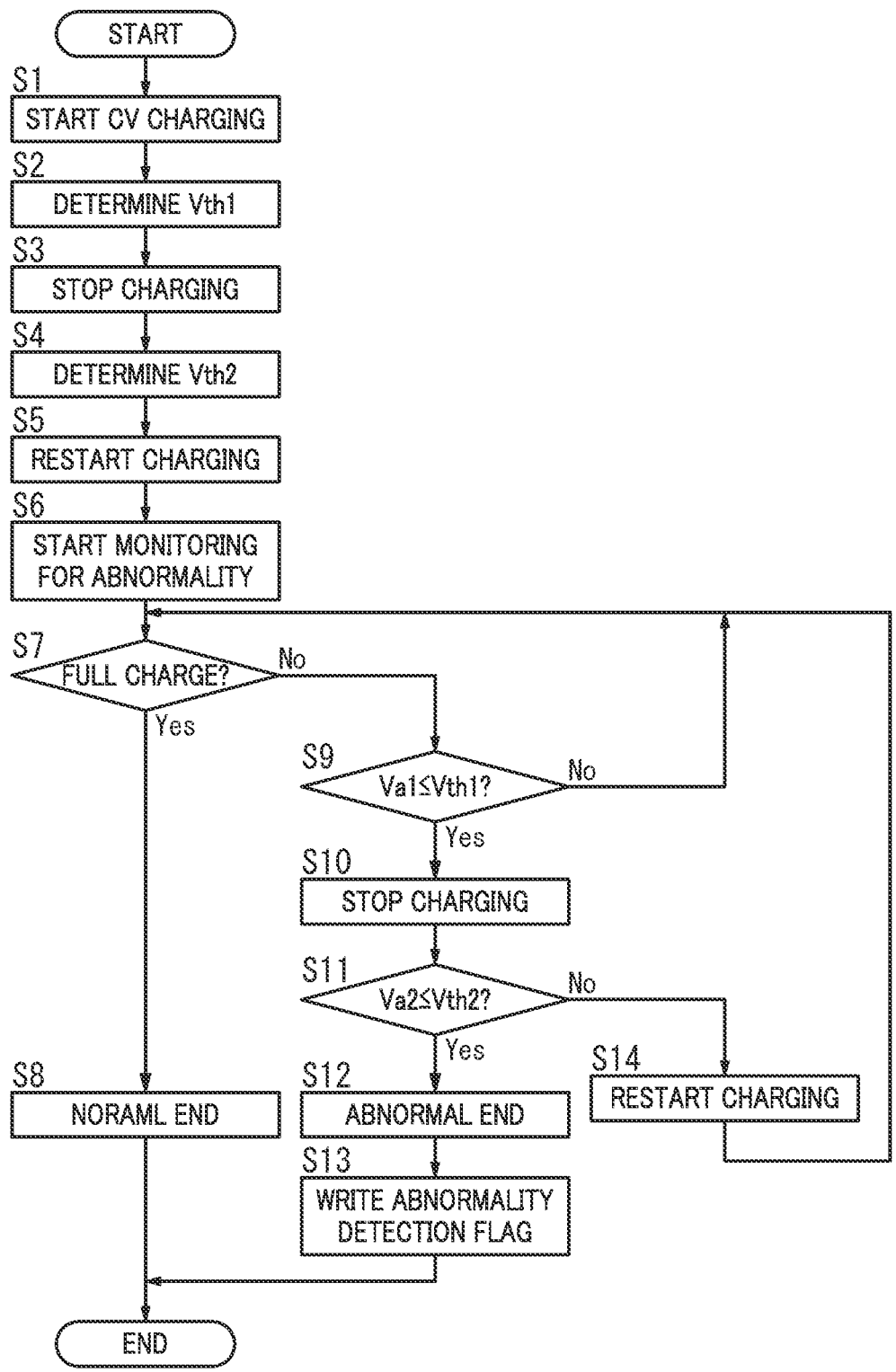
FIG. 3 is a flowchart illustrating operation of the charging system.

An operation example of the charger 1 (the charging system 100) of the present embodiment will be briefly described below with reference to the flowchart in FIG. 3.

The charger 1 changes its charging mode from the CC charging to the CV charging by receiving the switching signal from the battery pack 5 (step S1: start of CV charging).

The charger 1 executes a process for determining the first reference value Vth1 immediately after starting the CV charging (step S2).

Then, when the charger 1 determines the first reference value Vth1, the charger 1 stops the charging operation (step S3) and executes a process for determining the second reference value Vth2 (step S4).

When the charger 1 determines the second reference value Vth2, the charger 1 executes the return process for restarting the charging operation (step S5).

Thereafter, when the charger 1 restarts the charging operation, the charger 1 starts monitoring the battery pack 5 for an abnormality (step S6).

The charger 1 checks whether or not the charging capacity is fully charged during the CV charging (step S7), and if the charging capacity is fully charged (step S7: Yes), the charger 1 ends the CV charging (step S8: normal end).

If the charging capacity is not fully charged (step S7: No), the charger 1 determines whether or not the acquisition voltage decreases and "Va1≤Vth1" is satisfied (step S9: first determining process).

When the charger 1 determines that "Va1≤Vth1" is satisfied (step S9: Yes), the charger 1 stops the charging operation (step S10), and subsequently, the charger 1 determines whether or not "Va2≤Vth2" is satisfied (step S11: second determining process). Note that if the charger 1 determines in step S9 that "Va1≤Vth1" is not satisfied (step S9: No), the process returns to step S7.

If the charger 1 determines in step S11 that "Va2≤Vth2" is satisfied (step S11: Yes), the charger 1 determines that the signs of an abnormality in the battery pack 5 is present, and the charger 1 completely stops without restarting the charging (step S12: abnormal end). The charger 1 switches the lighting mode of the display 16 from the intermittent lighting mode to the flashing lighting mode and notifies a user that the charging is forcibly stopped. Moreover, the charger 1 causes the abnormality detection flag to be written in the storage 54 of the battery pack 5 (step S13).

Note that if the charger 1 determines in step S11 that "Va2≤Vth2" is not satisfied (step S11: No), the charger 1 executes the return process for restarting the charging operation (step S14), and the process returns to step S7.

As described above, the charger 1 of the present embodiment stops the charging operation when the acquisition voltage decreases and the predetermined condition "Va1≤Vth1" is satisfied during the CV charging (in the second charging mode). This reduces the possibility that the charging operation is continued in a state where an abnormality such as an internal short-circuit is about to occur in the battery pack 5. Consequently, the charging system 100 has the advantage that the reliability relating to charging of the battery pack 5 can be improved. Moreover, the predetermined reference value (the first reference value Vth1) is a value based on the actually measured value, and therefore, the charging operation can be stopped based on determination with increased reliability.

In addition, after a predetermined time T2 has elapsed since the charging operation was stopped, the controller 12 executes a determining process (the second determining process: Va2≤Vth2) of determining the presence or absence of (signs of) an abnormality in the battery pack 5, and if (the signs of) the abnormality is absent in the second determining process, the controller 12 restarts the charging operation. Therefore, returning can be achieved in a case where the charging operation is stopped when the predetermined condition "Va1≤Vth1" is occasionally satisfied due to, for example, the influence of a ripple voltage or the like, but in fact, not due to the abnormality. Consequently, the reliability relating to the charging can be further improved.

Moreover, the second determining process (confirmation at the OCV) is performed based on the acquisition voltage acquired in a state where the charging operation is stopped, that is, in a state where the charge current is adjusted to 0 (zero) A, and therefore, the reliability relating to the charging can be further improved. In particular, the prescribed reference value (the second reference value Vth2) is also a value based on the actually measured value, and the actually measured value thereof is also acquired in a state where the charge current is adjusted to 0 (zero) A, and therefore, a determining process with increased reliability is achieved.

The charger 1 may have another protection function of, for example, detecting a current abnormality and cutting off or reducing the current. In this case, when the predetermined condition "Va1≤Vth1" is satisfied by execution of the protection function, the second determining process can then be started. In sum, the feedback control for adjusting the charge current to 0 ampere may be executed following a reduction in the charge current due to the protection function. In this case, if the current value at the time point at which the feedback control for adjusting the charge current to 0 ampere is defined as the target value at the time of restarting the charging operation, the target value may be 0 ampere. To prevent this, the above-described "definite time T5" is set. In other words, determining the target value of the charge current at the time of the restarting with the definite time T5 being set enables application of the above-described second determining process even when the charger 1 has, for example, another protection function mentioned above.

(3) Variation

The embodiment is a mere example of various embodiments of the present disclosure. Various modifications may be made depending on design and the like as long as the object of the present disclosure is achieved. Moreover, functions similar to those of the charging system 100 according to the embodiment may be embodied by a charging method, a computer program, a non-transitory storage medium storing a computer program, or the like.

Specifically, the charging method according to an aspect includes an acquisition step, a transfer step, and a stopping step. The acquisition step includes acquiring, as an acquisition voltage, a voltage V1 between terminals or a cell voltage of each of the one or more battery cells in the battery pack 5 which is being charged. The transfer step includes, when the voltage V1 between the terminals or the cell voltage reaches a target voltage, causing a first charging mode allowing fast charging to transition to a second charging mode in which a charge current is lower than in the first charging mode. The stopping step includes stopping charging operation when the acquisition voltage decreases and the aspect of the decrease in the acquisition voltage satisfies the predetermined condition in the second charging mode.

Variations of the embodiment will be described below. Note that any of the variations to be described below may be combined as appropriate. In the following description, the embodiment described above will be sometimes referred to as a "basic example".

The charging system 100 according to the present disclosure includes a computer system. The computer system includes, as principal hardware components, a processor and a memory. The functions of the charging system 100 according to the present disclosure may be performed by making the processor execute a program stored in the memory of the computer system. The program may be stored in the memory of the computer system in advance, provided via telecommunications network, or provided as a non-transitory recording medium such as a computer system-readable memory card, optical disc, or hard disk drive storing the program. The processor of the computer system may be made up of a single or a plurality of electronic circuits including a semiconductor integrated circuit (IC) or a large-scale integrated circuit (LSI). The integrated circuit such as IC or LSI mentioned herein may be referred to in another way, depending on the degree of the integration and includes integrated circuits called system LSI, very-large-scale integration (VLSI), or ultra-large-scale integration (ULSI). A field-programmable gate array (FPGA), which is programmable after fabrication of the LSI, or a logical device which allows reconfiguration of connections in LSI or reconfiguration of circuit cells in LSI may be adopted as the processor. Those electronic circuits may be either integrated together on a single chip or distributed on multiple chips, whichever is appropriate. The plurality of chips may be collected in one device or may be distributed in a plurality of devices. As mentioned herein, the computer system includes a microcontroller including one or more processors and one or more memories. Thus, the microcontroller is also composed of one or more electronic circuits including a semiconductor integrated circuit or a large-scale integrated circuit.

Collecting the plurality of functions in the charging system 100 in one housing is not an essential configuration. The components of the charging system 100 may be distributed in a plurality of housings.

In contrast, the plurality of functions in the charging system 100 may be collected in one housing as in the case of the basic example. Moreover, at least some functions of the charging system 100, for example, some functions of the charging system 100 may be realized by cloud (cloud computing) or the like.

In the basic example, for example, an object to be charged by the charging system 100 is a battery pack for an electric tool, and the battery cell 50 is a lithium-ion battery. However, the object to be charged by the charging system 100 may be a battery pack of a component other than the electric tool, and the kinds of the battery cell 50 may be a lithium polymer battery, a lead battery, an all-solid-state battery, or a phosphoric acid iron lithium battery other than the lithium-ion battery.

In the basic example, the predetermined condition is that the voltage value of the acquisition voltage is smaller than or equal to the predetermined reference value (the first reference value Vth1). However, the predetermined condition is not limited to that the comparison target is the voltage value. For example, the predetermined condition may be that the gradient of a decreasing acquisition voltage is greater than or equal to a definite gradient or that a decreasing amount is greater than or equal to a definite value.

In the basic example, when the predetermined reference value (the first reference value Vth1) is once determined immediately after switching from the CC charging to the CV charging, the predetermined reference value is not changed during the following monitoring for an abnormality until the normal end or the abnormal end of the charging. However, the predetermined reference value may be updatable while monitoring is performed for an abnormality. For example, after the processor 10 starts monitoring for an abnormality, the processor 10 may compute a predetermined reference value each predetermined time (e.g., within a range of about 10 seconds to about 5 minutes) and may update the predetermined reference value by the latest predetermined reference value. Alternatively, the processor 10 may update the predetermined reference value when the detection temperature of the battery cell 50 is higher than or equal to the predetermined temperature. Still alternatively, the processor 10 may compute the predetermined reference value each predetermined time, compare the latest "predetermined reference value" thus computed to the "predetermined reference value" currently set, and only when the latest "predetermined reference value" thus computed is larger, the processor 10 may update the predetermined reference value with the latest "predetermined reference value".

In the basic example, the process of determining the first reference value Vth1 is performed in the reference value determining process (in the times t0 to t4), and thereafter, the process of determining the second reference value Vth2 is performed. However, the order of the processes may be changed such that the process of determining the second reference value Vth2 is performed at first.

In the basic example, the controller 12 executes the second determining process based on the acquisition voltage as a trigger. However, the controller 12 may execute the second determining process based on, for example, the detection temperature of the battery pack 5 as a trigger.

Specifically, when the detection temperature is a trigger, the controller 12 determines, in the first determining process, whether or not the detection temperature of the battery pack 5 is higher than or equal to the reference value. When the controller 12 determines that the detection temperature is higher than or equal to the reference value (comparison determination of the increasing rate or the rise value of a temperature may be adopted), the controller 12 performs the feedback control for adjusting the charge current to 0 ampere and then executes the second determining process (comparison of Va2≤Vth2). In this case, "the controller 12 is configured to stop charging operation when the acquisition voltage acquired by the acquirer 11 decreases and an aspect of a decrease in the acquisition voltage satisfies a predetermined condition in the second charging mode" is not an essential configuration for the charging system 100. When the detection temperature is a trigger, the reference value of a temperature for comparison is also preferably computed from an actually measured value.

Alternatively, the controller 12 may execute the second determining process based on the presence of an abnormality during the CC charging (in the first charging mode) as a trigger. For example, when the controller 12 detects an abnormality that the CC charging is not switched to the CV charging although a definite time has elapsed since the CC charging is started, the controller 12 performs the feedback control for adjusting the charge current to 0 ampere and then executes the second determining process (comparison of Va2≤Vth2). The second reference value Vth2 in this case is not an actually measured value but may be a value set in advance. Also in this case, "the controller 12 is configured to stop charging operation when the acquisition voltage acquired by the acquirer 11 decreases and an aspect of a decrease in the acquisition voltage satisfies a predetermined condition in the second charging mode" is not an essential configuration for the charging system 100.

In the basic example, the abnormality detection flag is written in the storage 54 of the battery pack 5 to manage charging impossible information representing that charging of the battery pack 5 becomes impossible due to abnormality detection. However, the charging impossible information may be managed not in the battery pack 5 but outside the battery pack 5 (e.g., on an external server or in the charger 1). For example, when the second determining process is performed and an abnormality is then detected in the battery pack 5 which is currently connected to the charger 1, the charger 1 stores the charging impossible information including the identification information of the battery pack 5 in the memory of the processor 10 or transmits the charging impossible information to an external server (with which wired or wireless communication is possible). The charging impossible information may be shared between a plurality of chargers 1 including the charger 1 that detects the abnormality.

(4) Summary

As described above, the charging system (100) according to the first aspect is configured to charge a battery pack (5) including one or more battery cells (50). The charging system (100) includes an acquirer (11) and a controller (12). The acquirer (11) is configured to acquire, as an acquisition voltage, a voltage (V1) across terminals or a cell voltage of each of the one or more battery cells (50) in the battery pack (5) which is being charged. The controller (12) is configured to, when the voltage between the terminals or the cell voltage reaches a target voltage, cause a first charging mode allowing fast charging to transition to a second charging mode in which a charge current is lower than in the first charging mode. The controller (12) is configured to stop charging operation when the acquisition voltage acquired by the acquirer (11) decreases and an aspect of a decrease in the acquisition voltage satisfies a predetermined condition in the second charging mode. The first aspect enables reliability relating to charging of the battery pack (5) to be improved.

In a charging system (100) of a second aspect referring to the first aspect, the predetermined condition is that the acquisition voltage has a voltage value smaller than or equal to a predetermined reference value (a first reference value Vth1). According to the second aspect, the charging operation is stopped when the acquisition voltage decreases and it is satisfied that the voltage value of the acquisition voltage is smaller than or equal to the predetermined reference value (the first reference value Vth1) in the second charging mode, and therefore, the second aspect enables the reliability relating to the charging to be improved by relatively simple determination.

In a charging system (100) of a third aspect referring to the second aspect, the predetermined reference value (the first reference value Vth1) is computed based on the acquisition voltage acquired by the acquirer (11) in a predetermined time period (T1). According to the third aspect, the predetermined reference value (the first reference value Vth1) is a value based on an actually measured value, and therefore, the third aspect enables the charging operation to be stopped based on determination with increased reliability.

In a charging system (100) of a fourth aspect referring to any one of the first to third aspects, the controller (12) is configured to execute a determining process of determining a presence or absence of an abnormality in the battery pack (5) after a lapse of a predetermined time (T2) since the charging operation is stopped. The controller (12) is configured to restart the charging operation when the absence of the abnormality is determined in the determining process. According to the fourth aspect, restarting of the charging operation can be achieved in a case where the charging operation is stopped when the predetermined condition is satisfied due to, for example, the influence of a ripple voltage or the like, but in fact not due to the abnormality, and consequently, the fourth aspect enables the reliability relating to the charging to be further improved.

In a charging system (100) of a fifth aspect referring to the fourth aspect, the controller is configured to determine in the determining process that the abnormality is absent when the voltage value of the acquisition voltage acquired by the acquirer (11) after the lapse of the predetermined time (T2) is larger than or equal to a prescribed reference value (a second reference value Vth2). According to the fifth aspect, the determining process is performed based on the acquisition voltage acquired in a state where the charging operation is stopped, that is, a state where the charge current is 0 (zero) A, and therefore, the fifth aspect enables the reliability relating to the charging to be further improved.

In a charging system (100) of a sixth aspect referring to the fifth aspect, the prescribed reference value (the second reference value Vth2) is computed based on the acquisition voltage acquired by the acquirer (11) within a prescribed time period (T3). According to the sixth aspect, the prescribed reference value (the second reference value Vth2) is a value based on the actually measured value, and therefore, a determination process is achieved with increased reliability.

In a charging system (100) of a seventh aspect referring to any one of the first to sixth aspects, the battery pack (5) is a battery pack for an electric tool (6). Thus, the seventh aspect enables reliability relating to the charging of the battery pack (5) for the electric tool (6) to be improved.

In a charging system (100) of an eighth aspect referring to any one of the first to seventh aspects, the first charging mode is a charging mode based on a constant current control method, and the second charging mode is a charging mode based on a constant voltage control method. Thus, the eighth aspect enables the reliability relating to the charging during operation in a charging mode based on the constant voltage control method to be improved.

A charging method of a ninth aspect is a charging method for charging a battery pack (5) including one or more battery cells (50). The charging method includes an acquisition step, a transfer step, and a stopping step. The acquisition step includes acquiring, as an acquisition voltage, a voltage (V1) across terminals or a cell voltage of each of the one or more battery cells in the battery pack (5) which is being charged. The transfer step includes, when the voltage between the terminals or the cell voltage reaches a target voltage, causing a first charging mode allowing fast charging to transition to a second charging mode in which a charge current is lower than in the first charging mode. The stopping step includes stopping charging operation when the acquisition voltage acquired in the acquisition step decreases and an aspect of a decrease in the acquisition voltage satisfies a predetermined condition in the second charging mode. Thus, the ninth aspect enables a charging method configured to improve the reliability relating to the charging of the battery pack (5) to be provided.

A program according to a tenth aspect is a program designed to cause one or more processors to execute the charging method of the ninth aspect. The tenth aspect can provide a function that enables the reliability relating to the charging of the battery pack (5) to be improved.

The charging system (100) according to an eleventh aspect is configured to charge a battery pack (5) including one or more battery cells (50). The charging system (100) includes an acquirer (11) and a controller (12). The acquirer (11) is configured to acquire, as an acquisition voltage, a voltage (V1) across terminals or a cell voltage of each of the one or more battery cells in the battery pack (5) which is being charged. The controller (12) is configured to, when the voltage between the terminals or the cell voltage reaches a target voltage, cause a first charging mode allowing fast charging to transition to a second charging mode in which a charge current is lower than in the first charging mode. The controller (12) is configured to stop charging operation when the acquisition voltage acquired by the acquirer (11) decreases and an aspect of a decrease in the acquisition voltage satisfies a predetermined condition in the second charging mode. The controller (12) is configured to restart the charging operation when the acquisition voltage acquired by the acquirer (11) has a voltage value larger than or equal to a prescribed reference value (second reference value Vth2) after a lapse of a predetermined time (T2) since the charging operation is stopped. Thus, the eleventh aspect enables reliability relating to the charging of the battery pack (5) to be improved.

The configurations according to the second to eighth aspects are not configurations essential for the charging system (100) and may thus be accordingly omitted.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. A charging system configured to charge a battery pack including one or more battery cells, the charging system comprising:
    an acquirer configured to acquire, as an acquisition voltage, a voltage between terminals or a cell voltage of each of the one or more battery cells in the battery pack which is being charged, and
    a controller configured to, when the voltage between the terminals or the cell voltage reaches a target voltage, cause a first charging mode allowing fast charging to transition to a second charging mode in which a charge current is lower than in the first charging mode, wherein:
    the controller is configured to stop charging operation when the acquisition voltage acquired by the acquirer decreases and an aspect of a decrease in the acquisition voltage satisfies a predetermined condition in the second charging mode,
    the controller is configured to determine the predetermined condition based on a predetermined reference voltage value,
    the controller is configured to determine the predetermined reference voltage value based on the acquisition voltage acquired by the acquirer in a predetermined time period, and
    the predetermined time period starts at a timing at which the first charging mode is caused to transition to the second charging mode.

2. The charging system of claim 1, wherein
    the battery pack is a battery pack for an electric tool.

3. The charging system of claim 1, wherein
    the first charging mode is a charging mode based on a constant current control method, and
    the second charging mode is a charging mode based on a constant voltage control method.

4. The charging system of claim 1, wherein
    the predetermined condition is that the acquisition voltage has a voltage value smaller than or equal to the predetermined reference voltage value.

5. The charging system of claim 2, wherein
    the controller is configured to
        execute a determining process of determining a presence or absence of an abnormality in the battery pack after a lapse of a predetermined time since the charging operation is stopped, and
        restart the charging operation when the absence of the abnormality is determined in the determining process.

6. The charging system of claim 5, wherein
    the controller is configured to determine in the determining process that the abnormality is absent when the voltage value of the acquisition voltage acquired by the acquirer after the lapse of the predetermined time is larger than or equal to a prescribed reference voltage value.

7. The charging system of claim 1, wherein
    the controller is configured to
        execute a determining process of determining a presence or absence of an abnormality in the battery pack after a lapse of a predetermined time since the charging operation is stopped, and restart the charging operation when the absence of the abnormality is determined in the determining process.

8. The charging system of claim 7, wherein
the controller is configured to determine in the determining process that the abnormality is absent when the voltage value of the acquisition voltage acquired by the acquirer after the lapse of the predetermined time is larger than or equal to a prescribed reference voltage value.

9. The charging system of claim 8, wherein
the controller is configured to determine the prescribed reference voltage value based on the acquisition voltage acquired by the acquirer within a prescribed time period during a reference value determination process prior to the determining process, and
the prescribed time period is a time period while the charging operation is temporarily stopped in the second charging mode.

10. A charging system configured to charge a battery pack including one or more battery cells, the charging system comprising:
an acquirer configured to acquire, as an acquisition voltage, a voltage between terminals or a cell voltage of each of the one or more battery cells in the battery pack which is being charged, and
a controller configured to, when the voltage between the terminals or the cell voltage reaches a target voltage, cause a first charging mode allowing fast charging to transition to a second charging mode in which a charge current is lower than in the first charging mode, wherein:
the controller is configured to
stop charging operation when the acquisition voltage acquired by the acquirer decreases and an aspect of a decrease in the acquisition voltage satisfies a predetermined condition in the second charging mode, and
restart the charging operation when the acquisition voltage acquired by the acquirer has a voltage value larger than or equal to a prescribed reference value after a lapse of a predetermined time since the charging operation is stopped,
the controller is configured to
determine the predetermined condition based on a predetermined reference voltage value, and
determine the predetermined reference voltage value based on the acquisition voltage acquired by the acquirer in a predetermined time period, and
the predetermined time period starts at a timing at which the first charging mode is caused to transition to the second charging mode.

11. A charging system configured to charge a battery pack including one or more battery cells, the charging system comprising:
an acquirer configured to acquire, as an acquisition voltage, a voltage between terminals or a cell voltage of each of the one or more battery cells in the battery pack which is being charged, and
a controller configured to, when the voltage between the terminals or the cell voltage reaches a target voltage, cause a first charging mode allowing fast charging to transition to a second charging mode in which a charge current is lower than in the first charging mode, wherein:
the controller is configured to stop charging operation when the acquisition voltage acquired by the acquirer decreases and an aspect of a decrease in the acquisition voltage satisfies a predetermined condition in the second charging mode,
the controller is configured to
execute a determining process of determining a presence or absence of an abnormality in the battery pack after a lapse of a predetermined time since the charging operation is stopped, and
restart the charging operation when the absence of the abnormality is determined in the determining process,
the controller is configured to determine in the determining process that the abnormality is absent when the voltage value of the acquisition voltage acquired by the acquirer after the lapse of the predetermined time is larger than or equal to a prescribed reference voltage value,
the controller is configured to determine the prescribed reference voltage value based on the acquisition voltage acquired by the acquirer within a prescribed time period during a reference value determining process performed prior to the determination process, and
the prescribed time period is a time period while the charging operation is temporarily stopped in the second charging mode.

12. A charging method for charging a battery pack including one or more battery cells, the charging method comprising:
an acquisition step of acquiring, as an acquisition voltage, a voltage between terminals or a cell voltage of each of the one or more battery cells in the battery pack which is being charged;
a transition step of, when the voltage between the terminals or the cell voltage reaches a target voltage, causing a first charging mode allowing fast charging to transition to a second charging mode in which a charge current is lower than in the first charging mode; and
a stopping step of stopping charging operation when the acquisition voltage acquired in the acquisition step decreases and an aspect of a decrease in the acquisition voltage satisfies a predetermined condition in the second charging mode, wherein:
the predetermined condition is determined based on a predetermined reference voltage value,
the predetermined reference voltage value is determined based on the acquisition voltage acquired by the acquirer in a predetermined time period, and
the predetermined time period starts at a timing at which the first charging mode is caused to transition to the second charging mode.

13. A non-transitory computer-readable tangible recording medium storing a program designed to cause one or more processors to execute the charging method of claim 12.

14. A charging method for charging a battery pack including one or more battery cells, the charging method comprising:
an acquisition step of acquiring, as an acquisition voltage, a voltage between terminals or a cell voltage of each of the one or more battery cells in the battery pack which is being charged,
a transition step of, when the voltage between the terminals or the cell voltage reaches a target voltage, cause a first charging mode allowing fast charging to transition to a second charging mode in which a charge current is lower than in the first charging mode, and
a stopping step of stopping charging operation when the acquisition voltage acquired in the acquisition step decreases and an aspect of a decrease in the acquisition voltage satisfies a predetermined condition in the second charging mode, a restart step of executing a determining process of determining a presence or absence of an abnormality in the battery pack after a lapse of a predetermined time since the charging operation is stopped, and restarting the charging operation when the absence of the abnormality is determined in the determining process, wherein:

in the determining process, determining that the abnormality is absent when the voltage value of the acquisition voltage acquired by the acquirer after the lapse of the predetermined time is larger than or equal to a prescribed reference voltage value, the prescribed reference voltage value is determined based on the acquisition voltage acquired by the acquirer within a prescribed time period during a reference value determining process performed prior to the determination process, and the prescribed time period is a time period while the charging operation is temporarily stopped in the second charging mode.

15. A non-transitory computer-readable tangible recording medium storing a program designed to cause one or more processors to execute the charging method of claim 14.

\* \* \* \* \*